Figure 1:
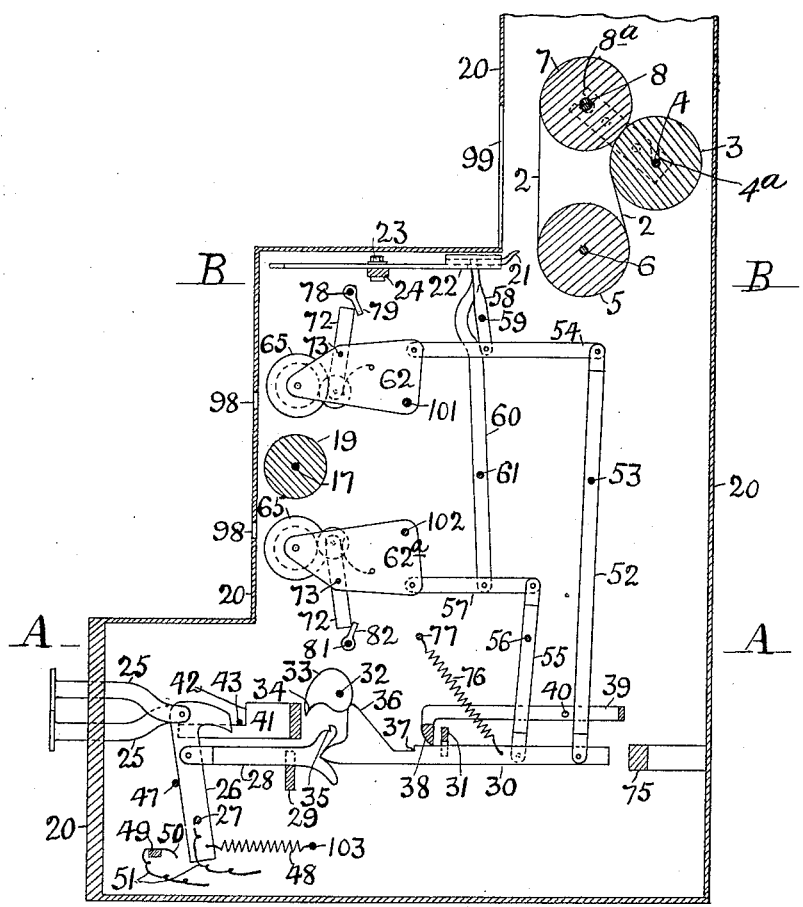

W. S. FOGGIN.
WORKMAN'S TIME RECORDER.
APPLICATION FILED JUNE 22, 1911.

1,064,308.

Patented June 10, 1913.
5 SHEETS—SHEET 1.

Witnesses:
A. Morrell
C. A. Walter.

Inventor:
William Shield Foggin
by R. Haddan
Attorney.

W. S. FOGGIN.
WORKMAN'S TIME RECORDER.
APPLICATION FILED JUNE 22, 1911.
1,064,308.
Patented June 10, 1913.
5 SHEETS—SHEET 2.
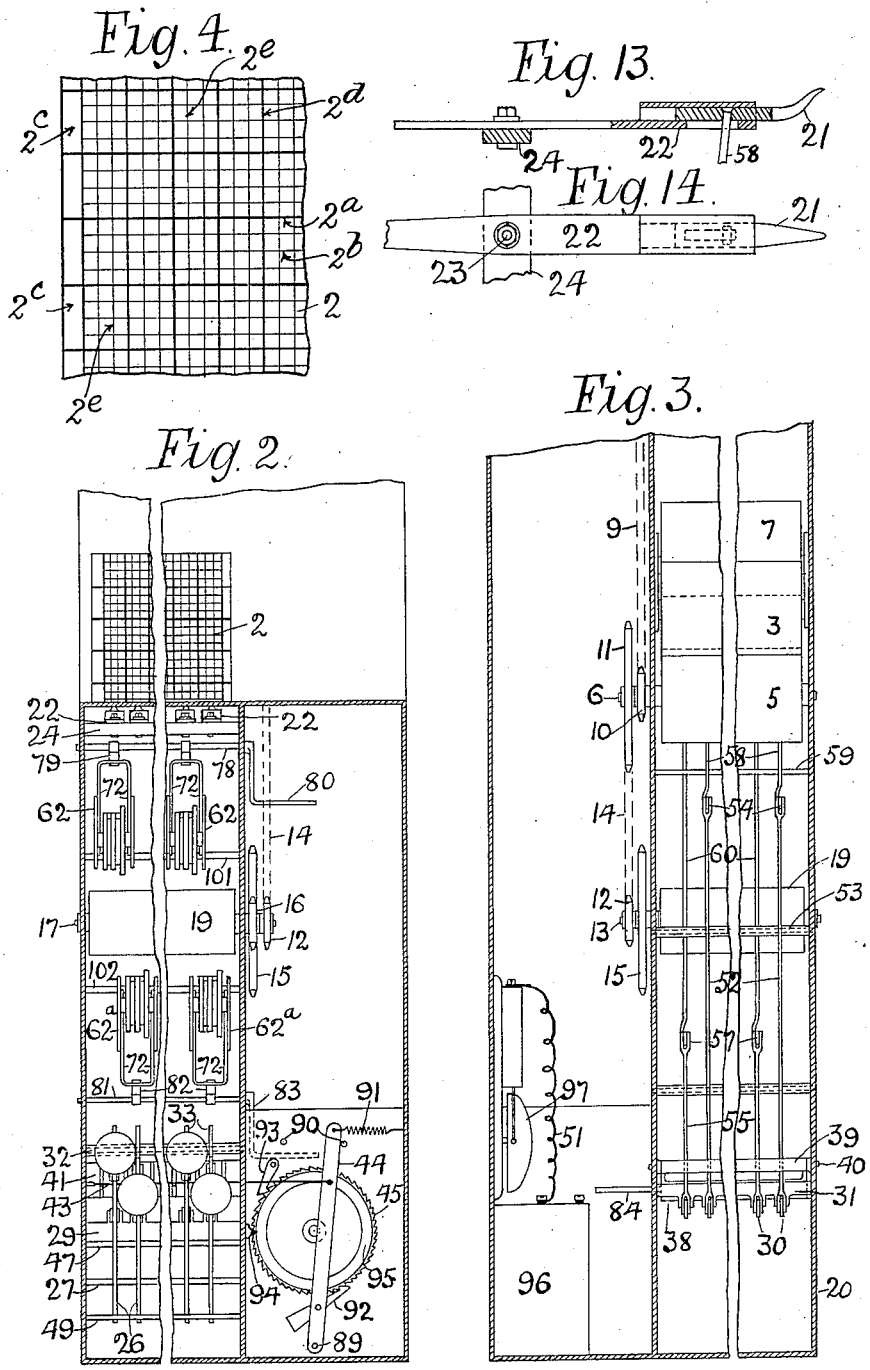

W. S. FOGGIN.
WORKMAN'S TIME RECORDER.
APPLICATION FILED JUNE 22, 1911.

1,064,308.

Patented June 10, 1913.
5 SHEETS—SHEET 3.

Witnesses:

Inventor:
William Shield Foggin.
by
Attorney.

W. S. FOGGIN.
WORKMAN'S TIME RECORDER.
APPLICATION FILED JUNE 22, 1911.
1,064,308.
Patented June 10, 1913.
5 SHEETS—SHEET 4.
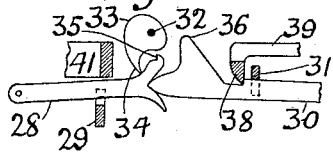
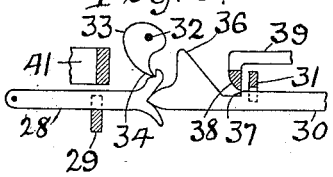
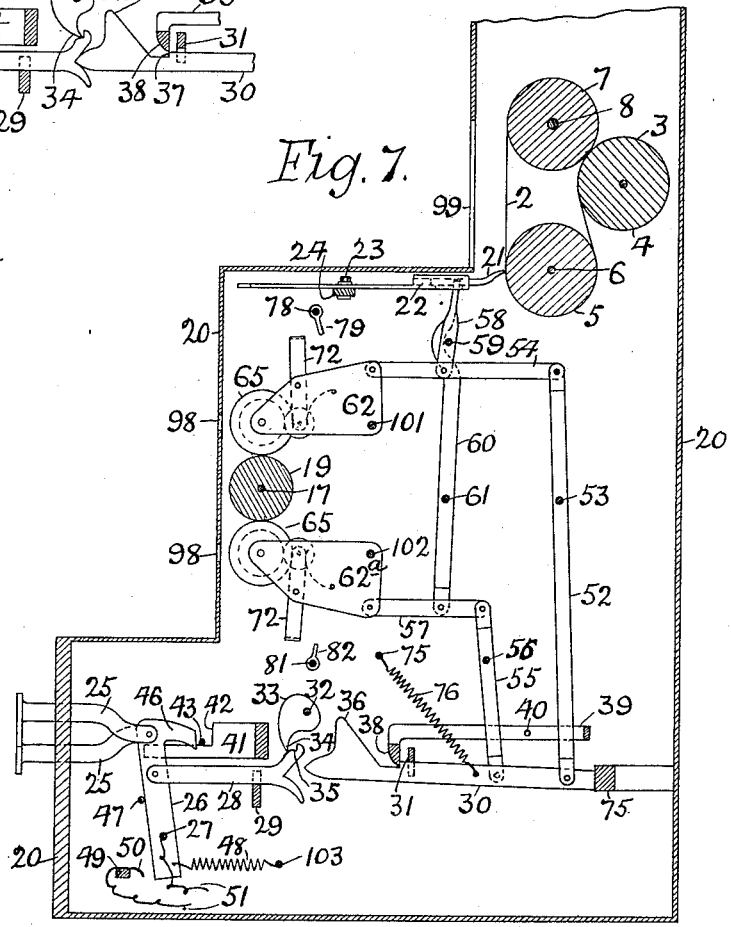
Witnesses:
Inventor:
William Shield Foggin.
by his Attorney.

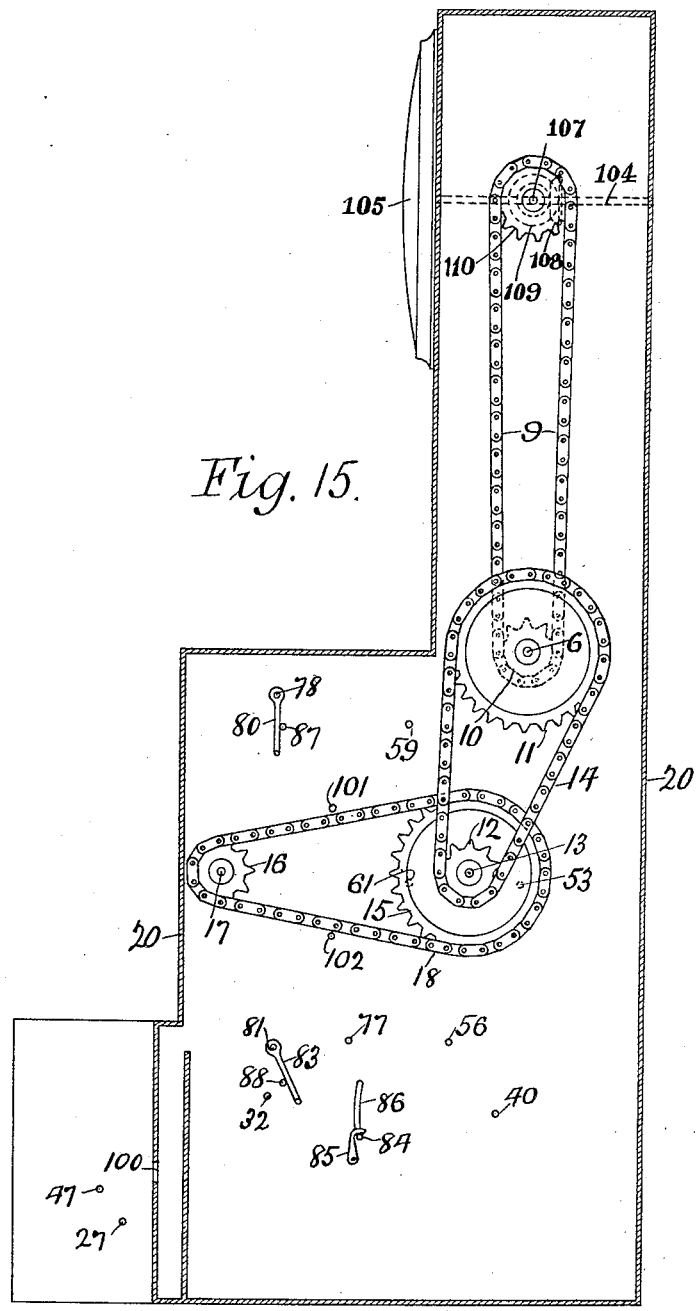

UNITED STATES PATENT OFFICE.

WILLIAM SHIELD FOGGIN, OF NEWCASTLE-UPON-TYNE, ENGLAND.

WORKMAN'S TIME-RECORDER.

1,064,308.   Specification of Letters Patent.   Patented June 10, 1913.

Application filed June 22, 1911. Serial No. 634,736.

*To all whom it may concern:*

Be it known that I, WILLIAM SHIELD FOG-GIN, a subject of the King of England, residing at Newcastle-upon-Tyne, Northumberland, in England, have invented certain new and useful Improvements in Workmen's Time-Recorders, of which the following is a specification.

This invention relates to improvements in workmen's time recorders involving the use of a record strip coöperating with a marker for indicating the times of starting and ceasing work of an employee, and also with an indicator for recording the total time worked, these parts being actuated by a push-member or equivalent manipulated by the workman in such a manner that said marker and indicator are moved into operative position on one manipulation of the push-member, then automatically retained in such operative position and finally returned to normal position on another manipulation of the push-member.

The present invention relates primarily to novel mechanism for actuating, retaining and releasing the marker and indicator, said mechanism including a pivotally mounted bifurcated catch bar, actuated by a push-member and co-acting with a locking bar in operative connection with the marker and indicator, said locking bar being held on one operation of the push-member in operative position by a retaining member and the catch bar returning to normal position on release of said push-member. On a subsequent operation of the push-member a cam is caused to engage the catch bar and on the latter operating the locking bar prevents engagement thereof with the retaining member, thus releasing all parts and allowing same to return to normal position, during which movement the cam is acted on by the locking bar to release it from the catch bar ready for the next operation.

The invention also comprises the combination with such mechanism of a tell-tale or counter capable of operation through a determined distance at each operation of the push-member.

The invention further comprises a novel construction of indicator used in such an apparatus and still further comprises the novel features of construction, combination and arrangement of parts, all as hereinafter fully described and specifically pointed out in the appended claims.

An embodiment of the invention is represented in the accompanying drawings in which—

Figure 5:
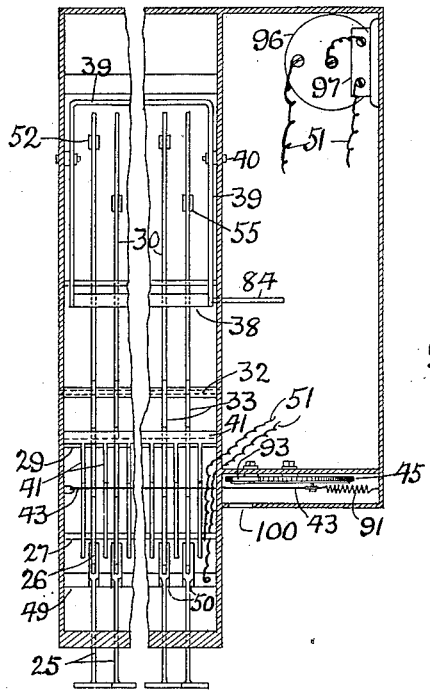
Figure 6:
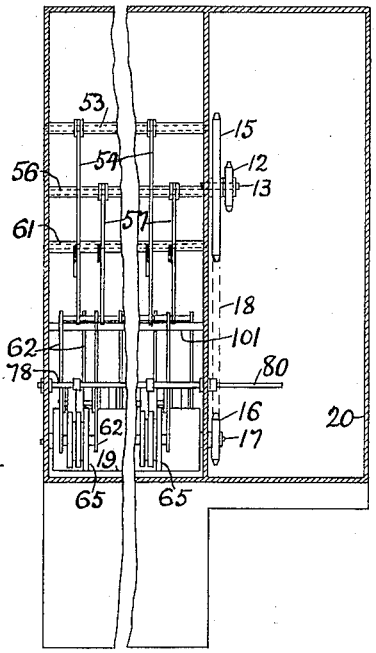
Figure 10:
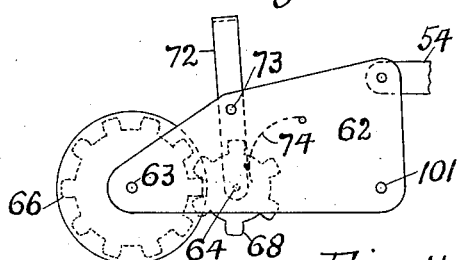
Figure 12:
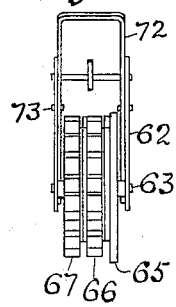
Figure 11:
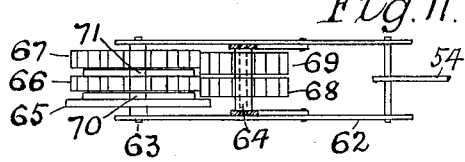

Figure 1 is a sectional elevation showing the general arrangement of the mechanism. Fig. 2 a front sectional elevation with part of the inclosing casing removed. Fig. 3 a rear sectional elevation also with part of the case removed. Fig. 4 shows an enlarged detail view of the recording paper. Fig. 5 is a sectional plan view on line A—A of Fig. 1. Fig. 6 is a sectional plan view on line B—B of Fig. 1. Fig. 7 is a view similar to Fig. 1, showing parts of the mechanism in recording position. Figs. 8 and 9 are detail views showing parts of the mechanism in positions intermediate those shown in Figs. 1 and 7. Fig. 10 is a side elevation, Fig. 11 a plan view, and Fig. 12 an end elevation of the indicator. Fig. 13 is a detail sectional elevation, and Fig. 14 a plan of the recording pencil carrier hereinafter referred to, and Fig. 15 a side elevation showing the driving mechanism.

The paper 2 having a specially prepared surface is of suitable breadth to suit the number of employees for which the machine is designed to record the time worked, and of sufficient length to serve say for 100 hours. The heavy horizontal lines $2^a$ in Fig. 4 designate hour divisions, and the intermediate finer lines $2^b$ quarter hours. The vertical side spaces $2^c$ are marked with the hours 1 to 12 in repeated order and the heavy vertical lines $2^d$ divide one employee's time from that of another. Each employee's record space is divided into three by fine vertical lines $2^e$, the central space being used for recording ordinary time; the left hand space say for overtime and the right hand space say for time on piece-work or other special work.

The paper is supplied to the machine coiled on a roller 3 mounted on a spindle 4, the loose end of the paper being led around roller 5 on a spindle 6, then around and coiled on a roller 7 carried by a spindle 8. The spindles 4 and 8 work in open bearings $4^a$ and $8^a$ respectively so that they can be readily lifted out to permit the roller 3 to be recharged and roller 7 emptied of the record. The roller 7 bears on roller 3 so that their peripheries have the same velocity and the roller 5, which is the driver, may be covered with a suitable material such as rubber so that the paper will not slip on its surface. The spindle 6 is driven by a clock (not shown) located for example on the top of the casing 20 by means of a chain 9 which passes around the wheel 10. A sprocket wheel 11 mounted on spindle 6 drives the sprocket wheel 12 on a shaft 13 by means of the chain 14, and a sprocket wheel 15 on shaft 13 drives a sprocket wheel 16 on shaft 17 by means of a chain 18, the shaft 17 carrying a roller 19 which may be covered with rubber or other suitable material.

21 designates a metallic pencil slidably held in a carrier 22 pivoted at 23 on a bar 24, there being a number of said pencils as indicated in Fig. 2. Push bars 25 extend through the casing 20 and are each pivotally connected to separate approximately vertical levers 26, pivoted at 27, and to which are connected catch bars 28 sliding in notches in a cross bar 29. The end of the catch bar 28 is indented to receive the shaped end of a locking bar 30 guided in a notch in a bar 31.

32 designates a transverse spindle carrying a gravity actuated pivoted locking dog 33 for each push bar 25, and consequently for each catch-bar 28, the point 34 of said dog being adapted to fit into a notch 35 in the end of the catch bar 28 as hereinafter described. The locking-bar 30 has a projection 36 the upper end of which comes into contact with the dog 33 as hereinafter described and forces the point 34 out of the aforesaid notch 35. The locking-bar 30 is also provided with a depression 37.

38 is a drop-bar having a frame 39 fixed at its ends and pivoted at 40.

41 indicates a comb fixed at its ends to the casing and between the teeth of which the vertical levers 26 work, said teeth being cut down as shown at 42, and a cord or tape 43 of suitable material being located at about the angle of the cut portion. One end of said cord 43 is fastened to the casing and the other end to a lever 44 which actuates a telltale 45, or counter. The tension of the cord 43 is such that only one push-bar 25 can be used at a time. The lever 26 is shaped at the top as shown at 46 for engaging the cord 43, and a stop bar 47 is provided for the levers 26, said bar extending between the sides of the casing, the levers being under the action of springs 48 which tend to keep them normally in contact with the stop-bar 47.

49 shows an insulated bar for carrying contact springs 50, one of which is provided for each bar 26, and 51, designates conductors to a bell 97 and battery 96 from pivot 27 and bar 49 respectively, so that at each actuation of a push-member a circuit is closed and the bell sounded.

To the rear end of the locking-bar 30 is pivotally connected a lever 52 pivoted on a bar 53 and connected at its upper end to a link 54 in connection with the upper indicator 62. In front of lever 52 is a further lever 55 pivoted on a bar 56, connected at its lower end to an alternate locking bar 30 and at its upper end to a link 57 connected to the lower indicator 62$^a$.

58 designates a lever pivoted on a bar 59, the lower end of said lever being connected to the link 54 and the upper end fitting into the aforesaid pencil 21. There is also provided a lever 60 pivoted on a bar 61, the lower end of said lever 60 being connected to the link 57, and its upper end fitting into an alternate pencil.

Each indicator includes two cheeks or side-plates 62, see more particularly Fig. 10, in which is carried one spindle 63, another spindle 64 being carried by a double lever 72. On spindle 63 are mounted a friction wheel 65 whose periphery is preferably roughened, and two wheels 66 and 67 each having ten teeth, the faces of which teeth are marked with the numerals "0" to "9." On the other spindle 64 are mounted two wheels 68 and 69. At each revolution of the friction wheel 65 a tooth 70 integral therewith engages a tooth of wheel 68 which is also in gear with wheel 66, so that the latter is moved through a space of one tooth. When the wheel 66 has been moved through one complete revolution, a tooth 71 integral therewith engages with a tooth of the wheel 69 which is also in gear with 67, and the latter is in turn moved through a space of one tooth. The lever 72 above mentioned is pivoted at 73 and carries at its lower end the spindle 64, the arrangement being such that when lever 72 is moved to one side the wheels on spindle 64 are thrown out of gear with the wheels on spindle 63 and wheels 66 and 67 are so weighted that they fall back to zero point.

74 is a spring acting on lever 72 to normally hold the respective sets of wheels in mesh.

Having described the main elements of the structure the remaining reference numerals indicate minor details coöperating in the action of the machine, viz., 75 is a bar restricting the inward or forward movement of the locking-bars 30. 76 a spring carried by a bar 77 for giving outward or backward movement to a locking bar 30, there being a spring for each bar. 78 a spindle having striking pieces 79 fixed thereto for throwing lever 72 of upper indicator 62 out of gear.

80 shows a handle on the end of spindle 78.

81, 82 and 83 show similar parts to those just described for the lower indicator 62$^a$. The upper and lower indicators are arranged for operation alternately.

84 designates a handle fixed to the drop-bar 38 for lifting same. 85 a hook for holding said drop-bar down against the action of the springs 76. 86 a slot in the casing; 87 and 88 stops for the handles 80 and 83 respectively. The lever 44 beforementioned is pivoted at 89 and its range is controlled by stops 90. 91 is a spring acting on said lever; 92 a driving-pawl, and 93 a check-pawl.

The tell-tale 45 is provided with the same number of teeth as the number of employees for which the machine is designed to record.

94 is a fixed pointer and 95 a space in which numbers are marked opposite each tooth of the tell-tale.

96 shows the electric battery cell and 97 the bell before referred to, 98 glazed holes in the casing for viewing the indicators; 99 a glazed hole in the casing for viewing the record paper; 100 a glazed hole in the casing for viewing the tell-tale.

101 is a bar on which the upper indicators are pivoted and 102 a bar on which lower indicators are pivoted.

103 designates a bar for the springs 48.

104 designates the hour hand spindle of the clock work and 105 indicates the clock face. On the spindle 104 is a bevel wheel 108 which gears with a similar wheel 109 on shaft 107, on which latter is a sprocket wheel 110 about which the sprocket chain 9 passes.

The casing is provided with suitable doors for access to the different parts of the machine. Each employee has a separate number, one of which is marked on the outer end of every push. The same numbers are also marked on the casing above the glazed holes 98 and 99, in positions corresponding to the indicator actuated, and the part of the paper recorded on by the operation of each individual push-bar 25.

The operation of the apparatus is as follows:—When the machine is at rest the different parts of the mechanism are as shown in Fig. 1. The roller 3 with the paper 2 coiled thereon is placed in its open bearings and the loose end of the paper brought around the roller 5 and fixed to the roller 7 in such a manner that the pencils 21 point to the same time on the paper as indicated by the clock and while the clock is in operation, rollers 5 and 19 are caused to revolve. An employee when commencing work registers by pressing the push-bar 25 corresponding to his number, and lever 26 brings the parts 28, 30 and locking dog 33 into the position shown in Fig. 8, the notch 37 in the locking-bar 30 engaging with the bar 38 owing to the pull of the spring 76. At the same time the lever 26 engages contact spring 50 thus completing the electric circuit and ringing the bell 97. Further the part 46 of lever 26 presses the cord 43 against the angle 42 of two adjacent teeth of the comb 41, this action tightening the cord, pulling lever 44 and moving the telltale 45 through one tooth. The bar 30 being pushed to its extreme inward position against the stop 75 actuates say lever 52 and link 54, thus bringing the upper indicator 62 down so that the wheel 65 bears upon and is revolved by the roller 19. At the same time the lever 58 is actuated by the link 54 and pencil 21 is brought against the record paper 2. If an adjacent push-bar is now pressed, the lower indicator 62$^a$ and another pencil are brought into contact with roller 19 and paper 2 respectively through lever 55, link 57 and lever 60. When the pressure on the push-bar is released, the action of the spring 48 brings the parts 25, 26 and 28 back to normal position; and leaves all the other parts in the positions shown in Fig. 7, and the record of the employee's time begins. On stopping work the employee again registers by pressing the push-bar 25, which causes the parts 28, 30 and swinging dog 33 to be brought into the position shown in Fig. 9. The point 34 of dog 33 during the movement falls into the notch 35 in the end of the catch-bar 28, and prevents the end of said catch-bar from rising, therefore when the bar 28 engages the end of locking-bar 30, the latter is forced down the inclined surface of the former, thus withdrawing the depression 37 from engagement with the bar 38. The bell is again rung by the completion of the electric circuit, and the telltale 45 is moved farther through one tooth. On removal of pressure on the push-bar the action of springs 76 and 48 brings all the several parts back to the position shown in Fig. 1, and projection 36 coming into contact with the dog 33 pushes the point 34 out of the notch 35.

Each indicator records the total time worked by an employee and the recording paper shows the times of starting and stopping. At any time the carrier 22 can be moved on its pivot 23 so that pencil 21 can be brought opposite any one of the three divisions on the record paper. Instead of each employee registering when stopping work, all the indicators in operation may be put out of operation at once by the timekeeper or other official lifting the bar 38 out of notch 37 by the handle 84 after first releasing the hook 85, thus bringing all the parts again into the position shown in Fig. 1. At the commencement of the week or at any other time all the indicators not in contact with the roller 19 can be turned back to zero by pushing over the levers 72 by means of the striking pieces 79 and 82 on shafts 78 and 81 actuated by handles 80 and 83 respectively.

What I claim as my invention and desire to secure by Letters Patent of the United States is:—

1. In a workman's time recorder the combination of a work starting and ceasing record strip, a marker therefor, a total work period indicator, a manually operated push-member, means for moving said marker and indicator into operative position on one actuation of said push-member, means for automatically retaining said marker and indicator in such operative position, and means for subsequently returning said marker and indicator to normal position on a succeeding actuation of said push-member.

2. In a workman's time recorder the combination of a work starting and ceasing record strip, a marker therefor, a total work period indicator, a manually operated push-member, means for moving said marker and indicator into operative position on one actuation of said push-member, means for automatically retaining said marker and indicator in such operative position, means for subsequently returning said marker and indicator to normal position on a succeeding actuation of said push-member, a tell-tale or counter and means for operating same through a determined distance at each actuation of the push-member.

3. In a workman's time recorder the combination of a work starting and ceasing record strip, a plurality of markers therefor, a plurality of total work period indicators, a plurality of manually operated push-members, means for moving one of said markers and indicators into operative position on actuation of one of the push-members, means for automatically retaining said marker and indicator in such operative position, means for moving another marker and indicator into operation on actuation of a different push-member and means for subsequently returning the markers and indicators to normal position on a succeeding actuation of the respective push-member.

4. In a workman's time recorder the combination of a work starting and ceasing record strip, a marker therefor, a total work period indicator, a manually operated push-member, a bifurcated pivoted catch-bar actuated by the push-member, a locking-bar coacting with the bifurcation of said catch-bar, a retaining member coacting with said locking-bar and operative connections between the said locking-bar and the indicator and marker.

5. In a workman's time recorder the combination of a work starting and ceasing record strip, a marker therefor, a total work period indicator, a manually operated push-member, a bifurcated pivoted catch-bar actuated by the push-member, a locking-bar co-acting with the bifurcation of said catch-bar, a retaining member coacting with said locking-bar, operative connections between the said locking-bar and the indicator and marker, a swinging dog coacting with the catch-bar to prevent engagement of the locking bar with the retaining member and means on said locking-bar for disengaging said dog from the catch-bar.

6. In a workman's time recorder, a manually operated push member, a catch bar actuated by the push member, a locking bar co-acting with said catch bar, a swinging dog for controlling the action of said catch bar upon said locking bar, and means for causing said dog to engage said catch bar upon every alternate actuation of said push member.

7. In a workman's time recorder the combination of a work starting and ceasing record strip, a marker therefor, a total work period indicator, a manually operated push-member, means for moving said marker and indicator into operative position on actuation of said push member, means for automatically retaining said marker and indicator in such operative position, and exteriorly operated means for returning the marker, indicator and operative means therefor, to normal inoperative position independently of the push-member.

8. In a workman's time recorder the combination of a work starting and ceasing record strip, a marker therefor, a total work period indicator, a manually operated push-member, a tell-tale or counter and means for actuating same through a determined distance at each actuation of the push-member, said means including a comb, a cord traversing the teeth thereof and a lever operated by the push-member adapted to engage said cord and tension same against the comb teeth.

9. In a workman's time recorder the combination of a work starting and ceasing record strip, a marker therefor, a total work period indicator, a manually operated push-member and means for moving said marker and indicator into operative position on actuation of said push-member, said indicator comprising a pivoted frame, counting wheels mounted therein, a driving member to operate said counting wheels, a friction wheel in connection with the counting wheels adapted to be brought into and out of engagement with said driving member, a rocking lever, pinions carried by said lever normally meshing with the counting wheels and means acting on said lever to throw the pinions out of mesh with the counting wheels and allow the latter to be zeroized by gravity.

In witness whereof I have signed this specification in the presence of two witnesses.

WILLIAM SHIELD FOGGIN.

Witnesses:
C. S. GARDNER,
FRED H. DUKE.